United States Patent
Fujita

(10) Patent No.: US 6,328,140 B1
(45) Date of Patent: Dec. 11, 2001

(54) DOUBLE WRAP BRAKE BAND APPARATUS

(75) Inventor: Kazuyuki Fujita, Fukuroi (JP)

(73) Assignee: NSK-Warner K.K., Tokyo (JP)

( * ) Notice: Subject to any disclaimer, the term of this patent is extended or adjusted under 35 U.S.C. 154(b) by 0 days.

(21) Appl. No.: 09/449,359

(22) Filed: Nov. 24, 1999

(30) Foreign Application Priority Data

Nov. 26, 1998 (JP) .................................. 10-335326

(51) Int. Cl.$^7$ ...................................................... F16D 51/00
(52) U.S. Cl. ........................................ 188/77 W; 188/259
(58) Field of Search ..................... 188/77 W, 249, 188/77 R, 259, 250 H; 192/80, 81 R, 107 T

(56) References Cited

U.S. PATENT DOCUMENTS

| | | | |
|---|---|---|---|
| 4,602,706 | * | 7/1986 | Blinks et al. .................. 188/259 |
| 4,757,880 | * | 7/1988 | Grzesiak ........................ 188/77 W |
| 5,012,905 | * | 5/1991 | Tanaka ............................ 188/250 H |
| 5,083,642 | * | 1/1992 | Stefanutti et al. ................. 188/77 W |
| 5,476,160 | * | 12/1995 | Fenoglio et al. ................... 188/77 W |

FOREIGN PATENT DOCUMENTS 37-6811     4/1962 (JP) .

* cited by examiner

*Primary Examiner*—Robert J. Oberleitner
*Assistant Examiner*—Mariano Sy
(74) *Attorney, Agent, or Firm*—Miles & Stockbridge P.C.

(57) ABSTRACT

A double wrap brake band apparatus is used as a brake of an automatic transmission, in which an inner race can be held for a very short time by operating only a band corresponding to about one winding. A second anchor or second applier is provided in the vicinity of a connection between an intermediate band and outer bands. The anchor comprises an anchor bracket secured to either band and an anchor pin for supporting the anchor bracket, and the applier comprises an apply bracket secured to either band and a piston for urging the apply bracket. When a second apply bracket is provided, pistons for urging first and second apply brackets are operated independently. The pistons are assembled as a dual construction to save space. When a single piston is provided, respective urging rods or respective apply brackets are connected to the piston via springs.

13 Claims, 10 Drawing Sheets

DOUBLE WRAP BRAKE BAND APPARATUS

BACKGROUND OF THE INVENTION

1. Field of the Invention

The present invention relates to a double wrap brake band apparatus used in an automatic transmission.

2. Related Background Art

A conventional double wrap brake band apparatus generally used in an automatic transmission will firstly be described. FIG. 9 is a front view showing a condition that a substantially C-shaped double wrap brake band apparatus 510 is disposed around an outer periphery of an inner race (drum) 528.

The double wrap brake band apparatus 510 comprises an intermediate band 512 and outer bands 514, 516. A connection member 536 is secured to one circumferential ends of the outer bands 514, 516 by rivets, and an anchor bracket 531 having a hole 530 for receiving an anchor pin 532 is secured to the other circumferential ends (free ends) of the outer bands 514, 516 by rivets.

On the other hand, the intermediate band 512 has one end (free end) received circumferentially between the outer bands 514, 516 and the other end spaced apart from the one end in a circumferential direction and secured to the connection member 536 by rivets in a condition that the other end is protruded circumferentially between the outer bands 514, 516.

Further, the intermediate band 512 is provided at its outer peripheral surface with an apply bracket 526 having a receiving surface 546a for receiving an urging force from an urging piston.

The double wrap brake band apparatus 510 having the above-mentioned construction is secured via the anchor pin 532 secured to the anchor bracket 531 and receives torque when the brake band apparatus tightens the inner race 528 by urging (downwardly in FIG. 9) the apply bracket 526 by means of an urging piston 520 having a base portion 522 and an urging rod 524.

FIG. 10 is a side view of the arrangement shown in FIG. 9. Friction materials 534 are adhered to inner peripheral surfaces of the intermediate band 512 and the outer bands 514, 516. As shown, from a released condition of the inner race 528, when the urging piston 520 is protruded or extended to urge an acting portion 546 of the apply bracket 526 downwardly, a force is transmitted to lower portions of the intermediate band 512 and the outer bands 514, 516. As a result, although the anchor bracket 531 tries to shift downwardly through the connection member 536, since the movement of the anchor bracket is prevented by the anchor pin 532, the intermediate band 512 and the outer bands 514, 516 tighten an outer peripheral surface of the inner race 528, thereby braking rotation of the inner race 528.

By the way, when the double wrap brake band apparatus 510 is used in the automatic transmission, a torque capacity to be allotted is varied with a using condition. For example, at a first speed in an R range or a D range, although high torque is allotted, torque to be allotted during transmitting may be about 1/10 of such high torque. However, in the transmitting, although the inner race 528 must be held for a very short time, since the double wrap brake band apparatus 510 has windings greater than a single winding brake band apparatus (not shown), the shifting amount of the urging piston 520 is increased accordingly, with the result that there arises a problem that it takes a relatively long time for completion of the operation of the double wrap brake band apparatus.

SUMMARY OF THE INVENTION

An object of the present invention is to provide a double wrap brake band apparatus used as a brake of an automatic transmission, in which an inner race can be held for a very short time by operating only a band portion corresponding to about one winding during transmitting.

To achieve the above object, in a double wrap brake band apparatus according to the present invention, second anchor means or apply means are provided in the vicinity of a connecting portion between an intermediate band and outer bands.

More specifically, the second anchor means is constituted by an anchor bracket secured to one of the bands and an anchor pin for supporting the anchor bracket, and the apply means is constituted by an apply bracket secured to one of the bands and a piston for urging the apply bracket.

When a second apply bracket is provided, the pistons for urging the first and second apply brackets are operated independently. To save a space, the pistons are assembled as a dual construction.

When a single piston is provided, respective urging rods or respective anchor brackets are connected to the piston via elastic means.

DETAILED DESCRIPTION OF THE PREFERRED EMBODIMENTS

Figure 1:
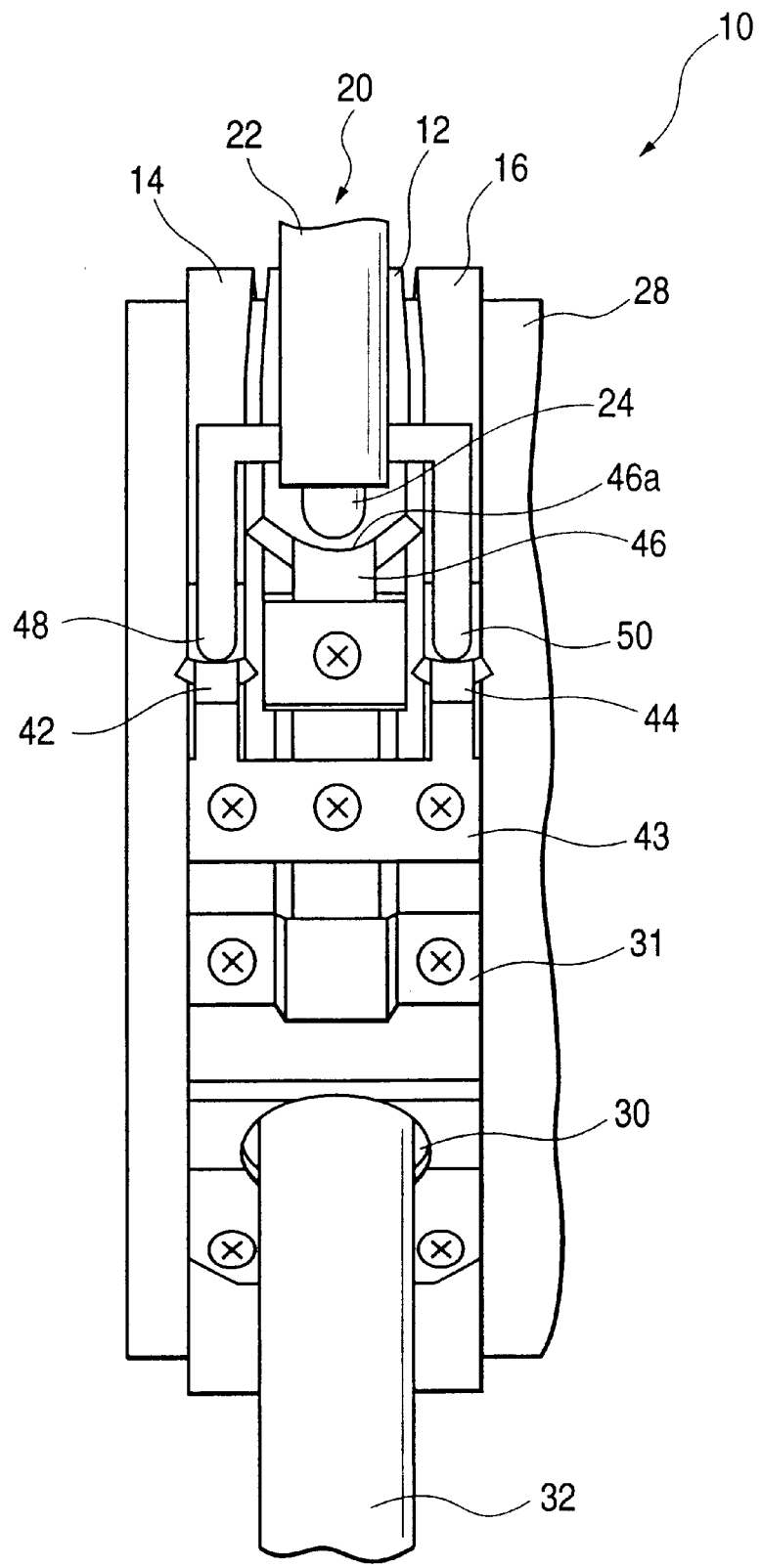
FIG. 1 is a front view showing a double wrap brake band apparatus according to a first embodiment of the present invention.

In a double wrap brake band apparatus according to the present invention, when a torque capacity to be allotted is great, a drum is tightened by the entire double wrap brake band by operating first anchor means and first apply means.

As is in transmitting, when the torque capacity to be allotted is small, the drum is tightened by a brake band portion corresponding to about one winding of the double wrap brake band apparatus by operating first anchor means and second apply means or by operating second anchor means and first apply means.

Now, embodiments of a double wrap brake band apparatus according to the present invention will be explained with reference to the accompanying drawings. In the drawings, the same elements are designated by the same reference numerals.

FIG. 1 is a front view showing a double wrap brake band apparatus 10 according to a first embodiment of the present invention. As can be seen from FIG. 1, a substantially C-shaped double wrap brake band apparatus 10 is disposed around an outer periphery of an inner race (drum) 28. The double wrap brake band apparatus 10 comprises an intermediate band 12 and outer bands 14, 16. A connection member 43 is secured to one circumferential ends of the outer bands 14, 16 by rivets, and an anchor bracket 31 having a hole 30 for receiving an anchor pin 32 is secured to the other circumferential ends (free ends) of the outer bands 14, 16 by rivets.

On the other hand, the intermediate band 12 has one end secured to the connection member 43 by rivets The other end of the intermediate band 12 is a free end opposed to the connection member 43 with a predetermined gap therebetween along a circumferential direction. Further, in the circumferential direction, the outer bands 14, 16 extend from the connection member 43 in a direction (downward direction in FIG. 1) opposite to a direction (upward direction in FIG. 1) along which the intermediate band 12 extends from the connection member 43. Namely, the free end of the intermediate band 12 is opposed to the free ends of the outer bands 14, 16 in the circumferential direction with the interposition of the connection member 43.

A first apply bracket 46 is integrally provided on the free end of the intermediate band 12 by caulking or welding, and second apply brackets 42, 44 are integrally provided on the outer bands 14, 16 by caulking or welding. A first urging rod 24 for urging the first apply bracket 46 and second urging rods 48, 50 for urging the second apply brackets 42, 44 are attached to an urging piston 20 via a first piston 52 (FIG. 3) and a second piston 54 (FIG. 3), respectively. Incidentally, when the urging piston 20 is not operated, the first urging rod 24 is not contacted with the first apply bracket 46. On the other hand, the second urging rods 48, 50 are contacted with the second apply brackets 42, 44, respectively.

Figure 2:
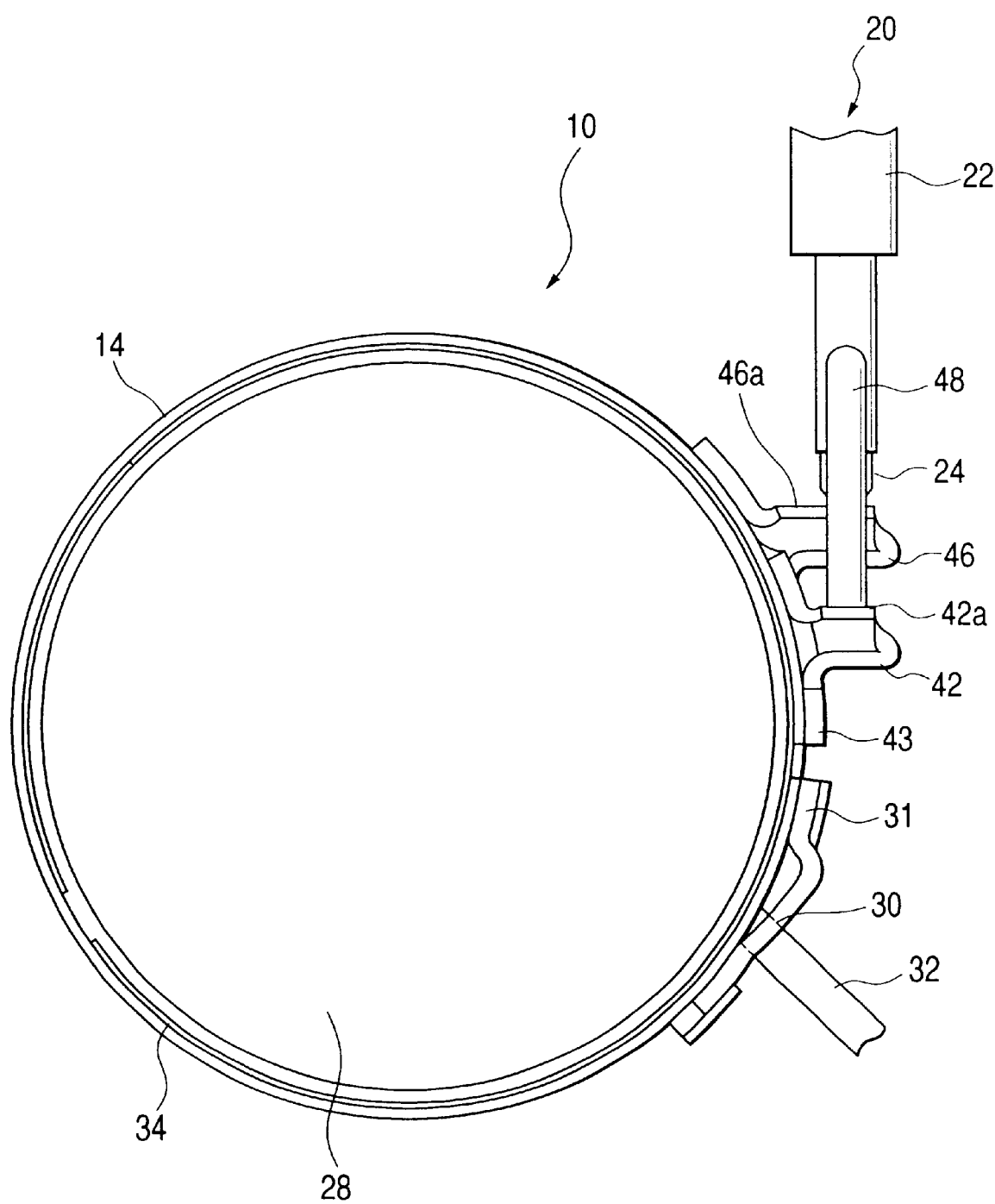
FIG. 2 is a side view showing the double wrap brake band apparatus according to the first embodiment of the present invention.

Now, the first apply bracket 46 and the second apply brackets 42, 44 will be described with reference to FIG. 2. The first apply bracket 46 has a substantially U-shaped cross-section including a curved receiving surface 46a and is mounted on an outer peripheral surface of the intermediate band 12 by welding or the like. The receiving surface 46a has a face substantially perpendicular to an axial direction of the first urging rod 24 and abuts against the first urging rod 24.

Next, the second apply brackets 42, 44 will be described. Incidentally, since the second apply brackets 42, 44 are identical in shape, only the second apply bracket 42 will be explained. Similar to the first apply bracket 46, the second apply bracket 42 has a substantially U-shaped cross-section including a curved receiving surface 42a and is mounted on the outer peripheral surface of the intermediate band 12 by welding or the like. The receiving surface 42a has a face substantially perpendicular to an axial direction of the second urging rod 48 and is smaller than the receiving surface 46a of the first apply bracket 46 and abuts against the second urging rod 48.

Friction materials 34 are adhered to inner peripheral surfaces of the intermediate band 12 and the outer bands 14, 16. In a condition that the urging piston 20 is not operated, the inner race 28 is released. In this condition, when the urging rod 24 is protruded to urge the apply bracket 46 downwardly, thereby trying the intermediate band 12 and the outer bands 14, 16 to shift downwardly via the connection member 43 and trying the anchor bracket 31 to shift downwardly.

However, the anchor bracket 31 is secured via the anchor pin 32 to prevent movement of the anchor bracket. Accordingly, the outer peripheral surface of the inner race 28 is tightened by the inner peripheral surfaces of the intermediate band 12 and the outer bands 14, 16, with the double wrap brake band apparatus 10 is subjected to torque, thereby braking rotation of the inner race 28.

On the other hand, when the urging rods 48, 50 are protruded to urge the apply brackets 42, 44 downwardly, although only the outer bands 14, 16 try to be shifted downwardly, since the shifting movements of the outer bands are prevented, the outer peripheral surface of the inner race 28 is tightened by the inner peripheral surfaces of he outer bands 14, 16.

When the double wrap brake band apparatus 10 is used in an automatic transmission, a torque capacity to be allotted is varied with a using condition.

For example, at a first speed in an R range or a D range, although high torque is allotted, torque to be allotted during transmitting may be about 1/10 of such high torque. In order to hold the inner race 28 for ea very short time during transmitting, if low torque is received, only the second piston 54 (FIG. 3) is operated so that the torque is received only by the outer bands 14, 16. On the other hand, if high torque must be received, the first piston 52 (FIG. 3) is operated so that the torque is received by the entire double wrap brake band.

Generally, the torque capacities of the brake band apparatus can be represented as follows:

$T = F \cdot R(e^{\mu\beta} - 1)$: normal rotation $T = F \cdot R(1 - 1/e^{\mu\beta})$: reverse rotation.

Where, T is torque capacity, F is apply load (piston urging force), R is an outer diameter of the drum, e is natural logarithm, $\mu$ is coefficient of friction and $\beta$ is a winding angle of the band.

Further, the normal rotation means that a rotational direction of the drum is the same as a direction of the apply load F, and the reverse rotation means that the rotational direction of the drum is opposite to the direction of the apply load F.

Figure 3:
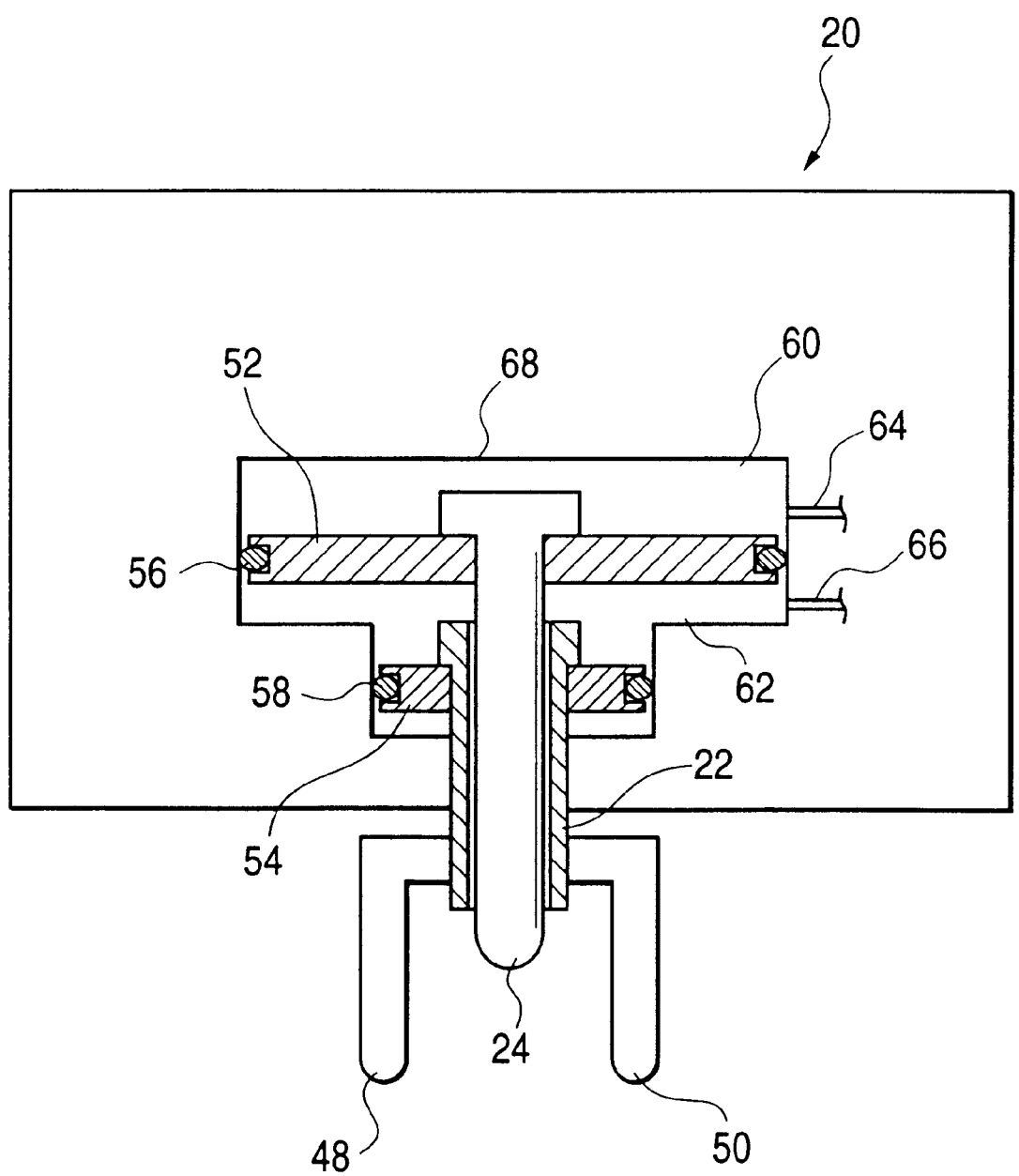
FIG. 3 is a partial sectional view of a piston of FIG. 1.

Next, a construction of the urging piston 20 will be explained with reference to FIG. 3. FIG. 3 is a partial sectional view of the urging piston 20 having the first piston 52 and the second piston 54. The urging piston 20 has a substantially cylindrical cylinder portion 68 which has a step along a vertical direction so that an inner diameter of an upper part of the cylinder portion 68 is greater than an inner diameter of a lower part of the cylinder portion. The upper part of the cylinder portion 68 defines a first cylinder within which the disc-shaped piston 52 is coaxially disposed, and the first urging rod 24 is coaxially mounted on the center of the first piston 52. Further, an O-ring (seal member) 56 is mounted on a peripheral surface of the first piston 52, and the first piston is sized so that it can be slid along an inner peripheral surface of the first cylinder in a condition that the O-ring is mounted on the first piston.

Further, a space defined by an upper surface of the first piston 52 and the interior of the first cylinder constitutes a first oil chamber 60. In order to apply oil pressure to the first piston, a first oil passage 64 for supplying oil is formed in a side wall of the first oil chamber 60.

A hollow cylindrical base portion 22 is coaxially and slidably mounted on a body portion of the first urging rod 24. A pair of L-shaped second urging rods 48, 50 which are symmetrical with respect to an axis of the base portion 22 are provided on an outer peripheral surface of the base portion 22.

On the other hand, the lower part of the cylinder portion 68 defines a second cylinder within which the substantially disc-shaped second piston 54 is coaxially disposed. An O-ring (seal member) 58 is mounted on a peripheral surface of the second piston 54, and the second piston is sized so that it can be slid along an inner peripheral surface of the second cylinder in a condition that the O-ring is mounted on the second piston.

A space defined by an upper surface of the second piston 54, lower surface of the first piston 52 and the first and second cylinders constitutes a second oil chamber 62. In order to apply oil pressure to the second piston 54, a second oil passage 66 for supplying oil is formed in a side wall between the pistons 52 and 54.

As mentioned above, the first piston 52 for urging the first apply bracket 46 of the intermediate band 12 and the second piston 54 for urging the second apply brackets 42, 44 of the outer bands 14, 16 are assembled as a dual construction. More specifically, the first urging rod 24 for urging the intermediate band 12 is disposed within the base portion 22 of the second urging rods 48, 50 for urging the outer bands 14, 16, and the second piston 58 is disposed near the urging rods and the first piston is disposed remotely from the urging rods.

Further, since a greater load must be applied to the first piston 52 in comparison with the second piston 54, an oil receiving surface of the first piston is greater than that of the second piston.

With this arrangement, when the first urging rod is operated, the oil pressure is supplied to the first oil chamber 60 through the first oil passage 64, and the oil is discharged from the second oil chamber 62 to decrease the oil pressure therein. On the other hand, when the second urging rods 48, 50 are operated, the oil pressure is supplied to the second oil chamber 62, and only the oil pressure for balancing with the pressure in the second oil chamber 62 is supplied to the first oil chamber 60.

Due to the above-mentioned construction, if the torque capacity to be allotted is small as is in the transmitting operation, only a brake band portion corresponding to about one winding can be operated by the second urging rods 48, 50, so that the inner race 28 can be held for a very short time.

Further, by adopting the dual construction, the space can be minimized.

Figure 4:
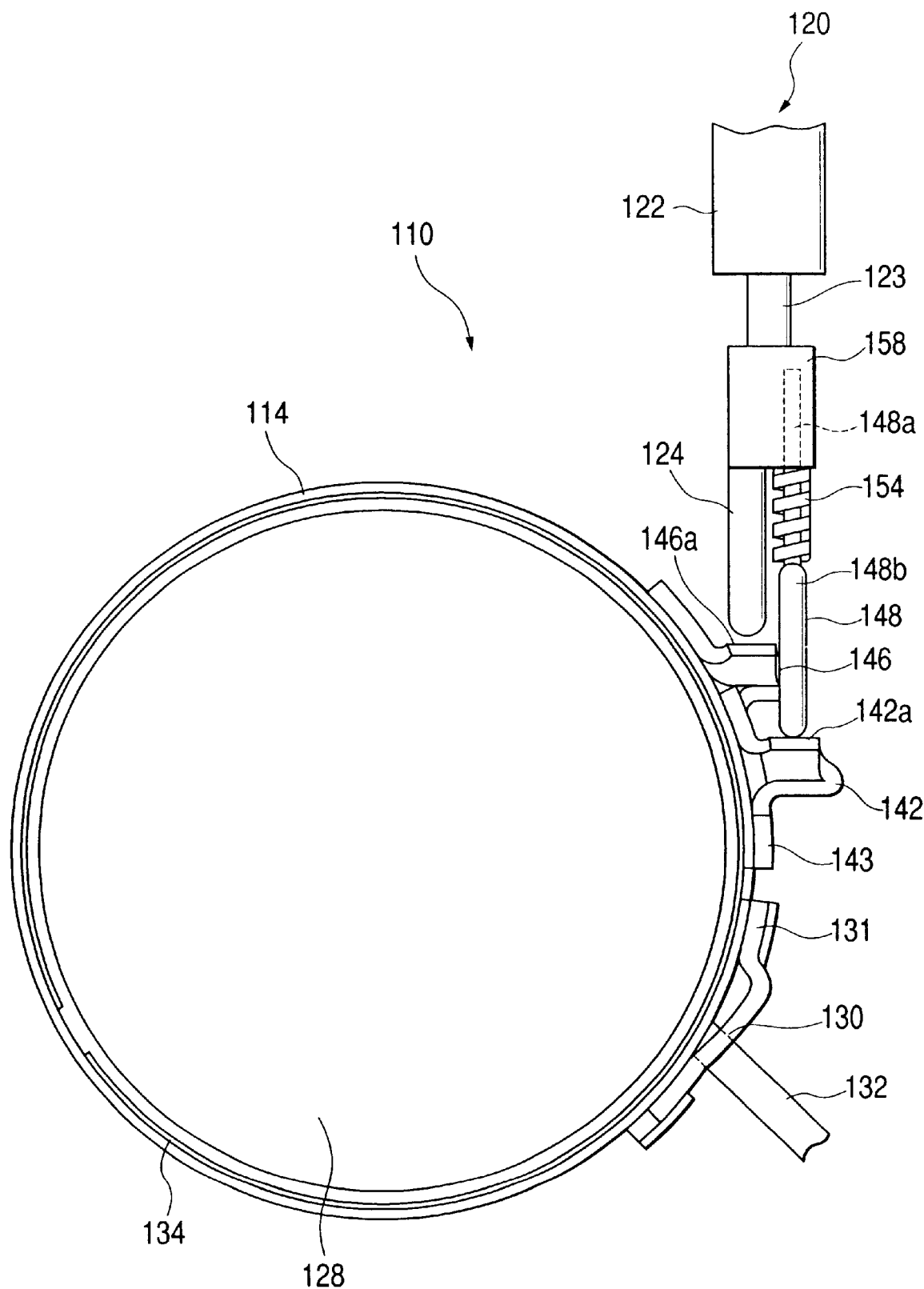
FIG. 4 is a side view showing a double wrap brake band apparatus according to a second embodiment of the present invention.

FIG. 4 is a side view showing a double wrap brake band apparatus 110 according to a second embodiment of the present invention. The double wrap brake band apparatus 110 has a similar construction to that of the double wrap brake band apparatus 110, and, thus, a substantially C-shaped double wrap brake band apparatus 110 is disposed around an outer periphery of an inner race 128. Incidentally, unlike to the first embodiment, only a single piston is provided. Further, in the second embodiment, since outer bands are identical in shape, only an outer band 114 will be explained.

The double wrap brake band apparatus 110 has an intermediate band (not shown) and two outer bands 114 (only one of which is shown). A connection member 143 is secured to one circumferential ends of the outer bands 114 by rivets, and an anchor bracket 131 having a hole 130 for receiving an anchor pin 132 is secured to the other circumferential ends of the outer bands by rivets.

The intermediate band has one end (free end) which is received circumferentially between the outer bands and to which the anchor bracket 131 is secured by rivets, and the other to which the connection member 143 is secured by rivets in a condition that the other end is protruded circumferentially between the outer bands 114.

A first apply bracket 146 is provided on the intermediate band, and second apply brackets 142 are provided on the outer bands 114. A first urging rod 124 for urging the first apply bracket 146 and a second urging rod 148 for urging the second apply brackets 142 are attached to a piston 120.

The rod-shaped first urging rod 124 is mounted on the piston via a connecting member 123 and a support member 158 so that a load from a base portion 122 of the piston 120 is directly transmitted to the first apply bracket 146.

On the other hand, the second urging rod 148 has a Y-shaped configuration branched on the way and thus includes a rod-shaped portion 148a and a pair of branched portions 148b. The rod-shaped portion 148a is slidably attached to the support portion 158 and a spring 154 is mounted around the rod-shaped portion 148a. With this arrangement, the load is transmitted to the second apply brackets 142 via elasticity of the spring 154.

Next, first and second apply brackets 146, 142 will be explained. The first apply bracket 146 has a substantially U-shaped cross-section including a curved receiving surface 146a and is mounted on an outer peripheral surface of the intermediate band by welding or the like. The receiving surface 146a has a face substantially perpendicular to an axial direction of the first urging rod 124 and abuts against the first urging rod 124.

Similar to the first apply bracket 146, the second apply bracket 142 has a substantially U-shaped cross-section including a curved receiving surface 142a and is mounted on the outer peripheral surface of the outer band 114 by welding or the like. The receiving surface 142a has a face substantially perpendicular to an axial direction of the second urging rod 148 and always abuts against the second urging rod 148.

Friction materials 134 are adhered to inner peripheral surfaces of the outer bands 114 and the intermediate band. In a condition that the inner race 128 is released, when the piston 120 is operated to protrude the urging rod 124 or 148 to urge the first and second apply brackets 146, 142 downwardly, a force is transmitted to lower portions of the intermediate band and the outer bands 114 through the connection member 143. As a result, although the anchor bracket 131 tries to shift downwardly, since the movement of the anchor bracket is prevented by the anchor pin 132, the inner peripheral surfaces of the intermediate band and the outer bands 114 tighten the outer peripheral surface of the inner race 128, thereby braking rotation of the inner race 128 by a friction force.

In the above-mentioned arrangement, when low torque is received, the load of the urging piston 120 is small, and the second urging rod 148 urges the second apply brackets 142. In this case, since the first urging rod 124 does not reach the receiving surface 146a of the first apply bracket 146, only the outer bands 114 are operated.

On the other hand, when high torque is received, the load of the urging piston 120 is great, and the spring 154 mounted on the second urging rod 148 is greatly compressed, with the result that the load is transmitted to the first apply bracket 146 by the first urging rod 124.

Accordingly, also in the double wrap brake band apparatus having only the single piston, the number of windings of the band to be operated can be changed in accordance with the torque to be received. For example, when the low torque is received, only the band portion corresponding to about one winding can be operated to hold the inner race 128 for a short time.

Figure 5:
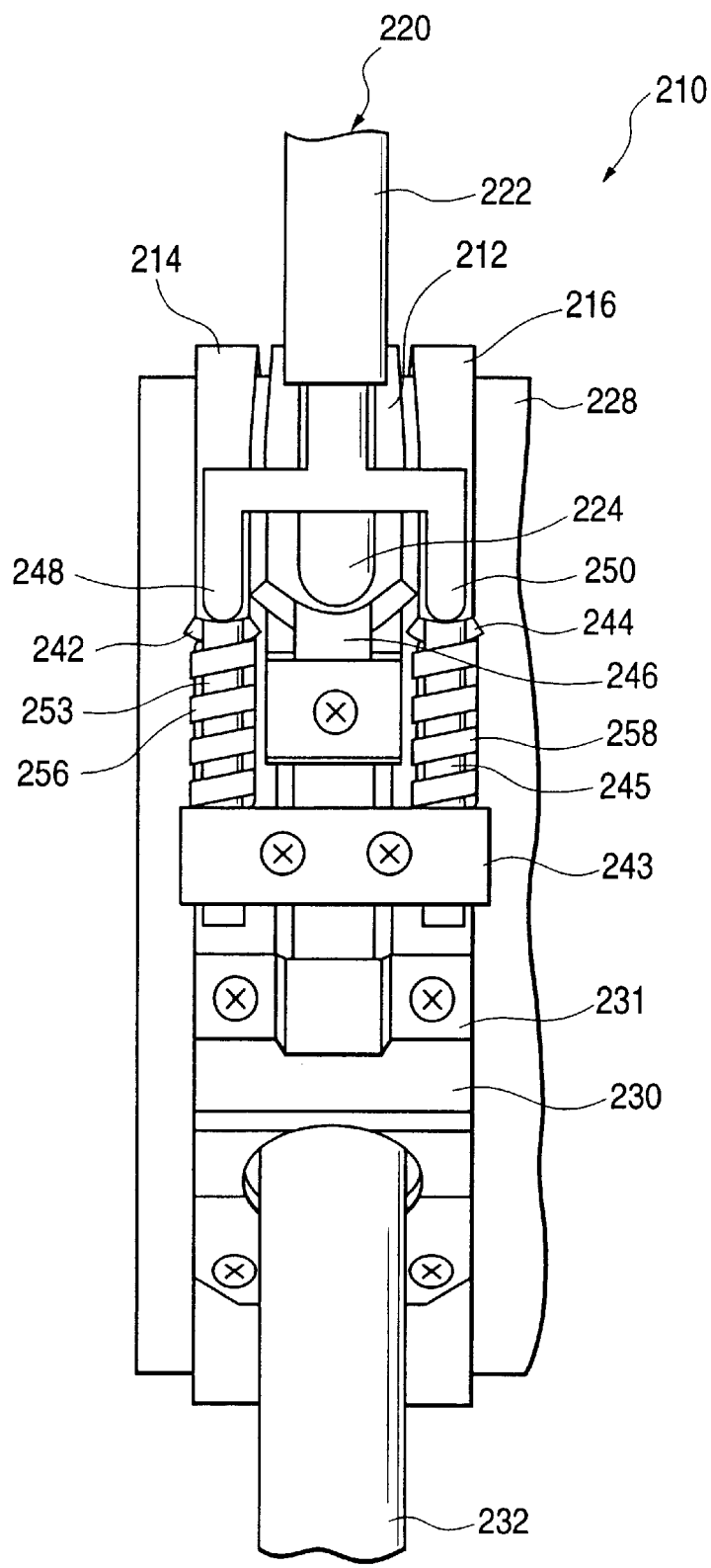
FIG. 5 is a front view showing a double wrap brake band apparatus according to a third embodiment of the present invention.
Figure 6:
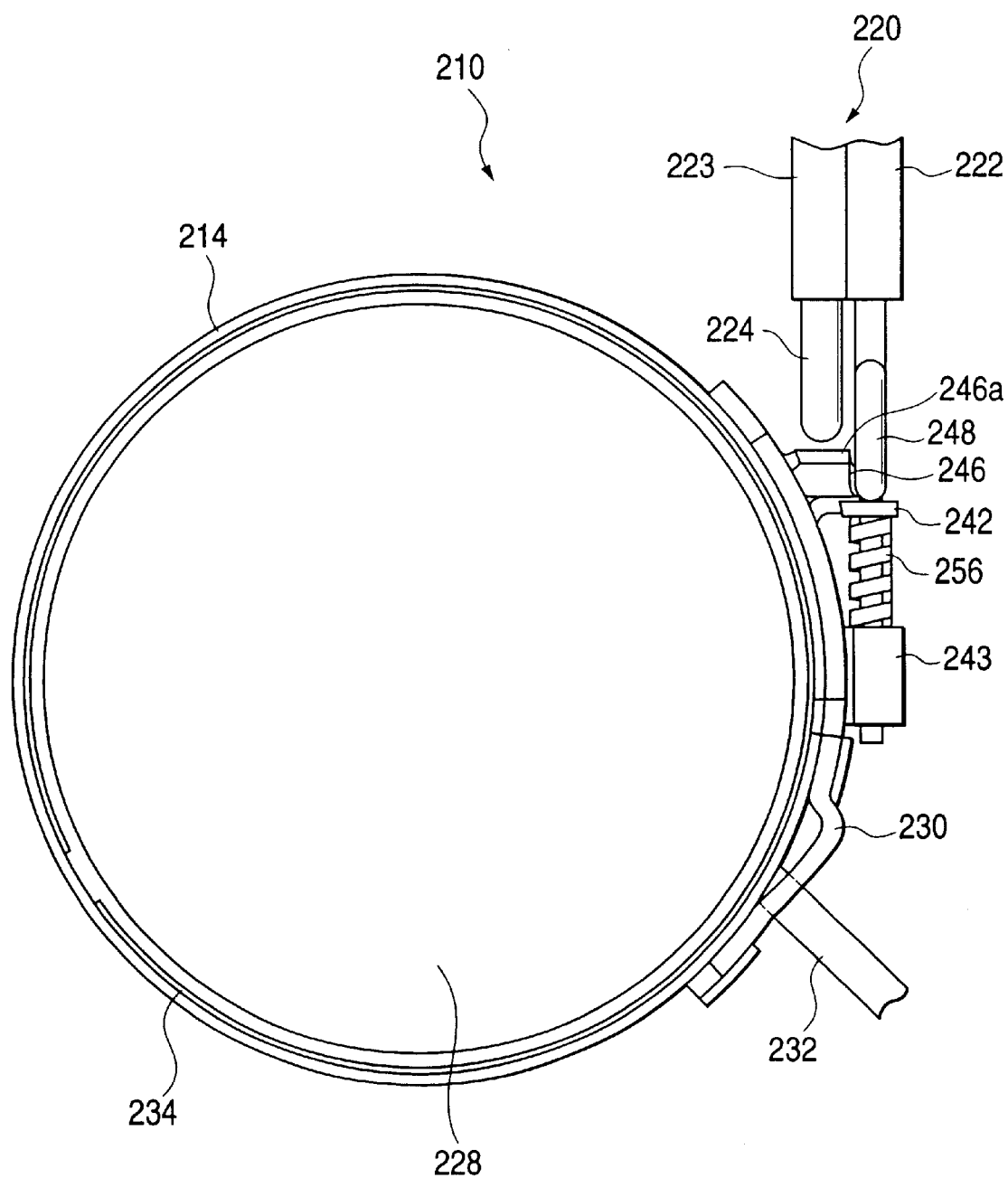
FIG. 6 is a side view showing the double wrap brake band apparatus according to the third embodiment of the present invention.

FIGS. 5 and 6 are views showing a double wrap brake band apparatus 210 according to a third embodiment of the present invention. This embodiment shows an example that the construction of the urging rods of the second embodiment is applied to apply brackets. A construction of a double wrap brake band is substantially the same as those in the first and second embodiments.

Second apply brackets 242, 244 are provided on one ends of rod-shaped posts 253, 245. The other ends of the posts 253, 245 are slidably (in a vertical direction in FIG. 5) mounted to a block 243. Elastic springs 256, 258 are mounted around the posts 253, 245 respectively. With this arrangement, loads from urging rods 248, 250 are received by the second apply brackets 242, 244.

On the other hand, similar to the first and second embodiments, a first apply bracket 246 has a substantially U-shaped cross-section including a curved receiving surface 246a and is mounted on an outer peripheral surface of an inner band 212 by welding or the like. The receiving surface 246a is a surface substantially perpendicular to an axial direction of a rod-shaped first urging rod 224, and abuts against the first urging rod 224.

Further, the first urging rod 224 and the second urging rods 248, 250 are integrally provided on a piston 220 via a base portion 222. In such an arrangement, similar to the second embodiment, when low torque is received, the load of the urging piston 220 is small, and the second urging rod 248 urges the second apply bracket 242. In this case, since the first urging rod 224 does not reach the first apply bracket 246, only outer bands 214, 216 are operated.

On the other hand, when high torque is received, the load of the urging piston 220 is great, and the springs 256, 258 mounted on the second apply brackets 242, 244 are greatly compressed, with the result that the load is transmitted to the first apply bracket 246 by the first urging rod 224.

Accordingly, also in the double wrap brake band apparatus according to the third embodiment, the number of windings of the band to be operated can be changed in accordance with the torque to be received. For example, when the low torque is received, only the band portion corresponding to about one winding can be operated to hold an inner race 228 for a short time.

Figure 7:
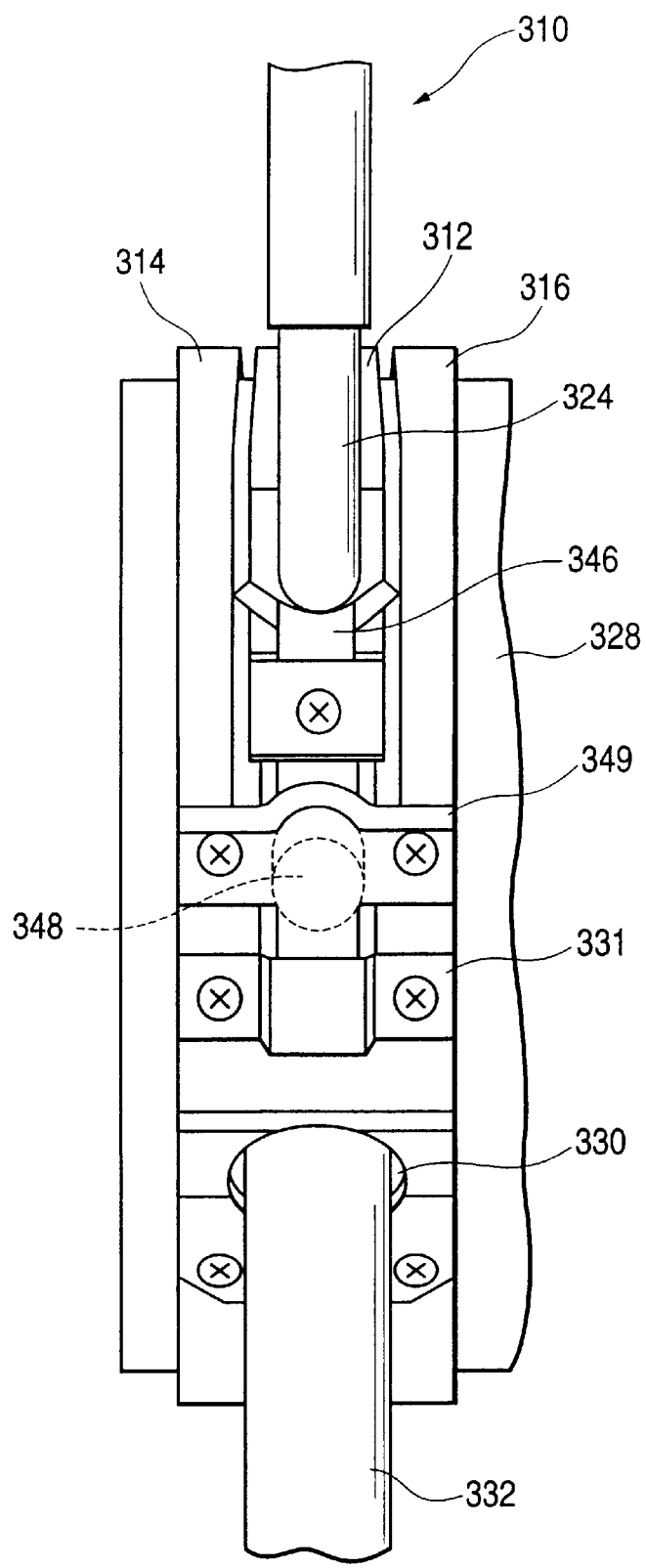
FIG. 7 is a front view showing a double wrap brake band apparatus according to a fourth embodiment of the present invention.
Figure 8:
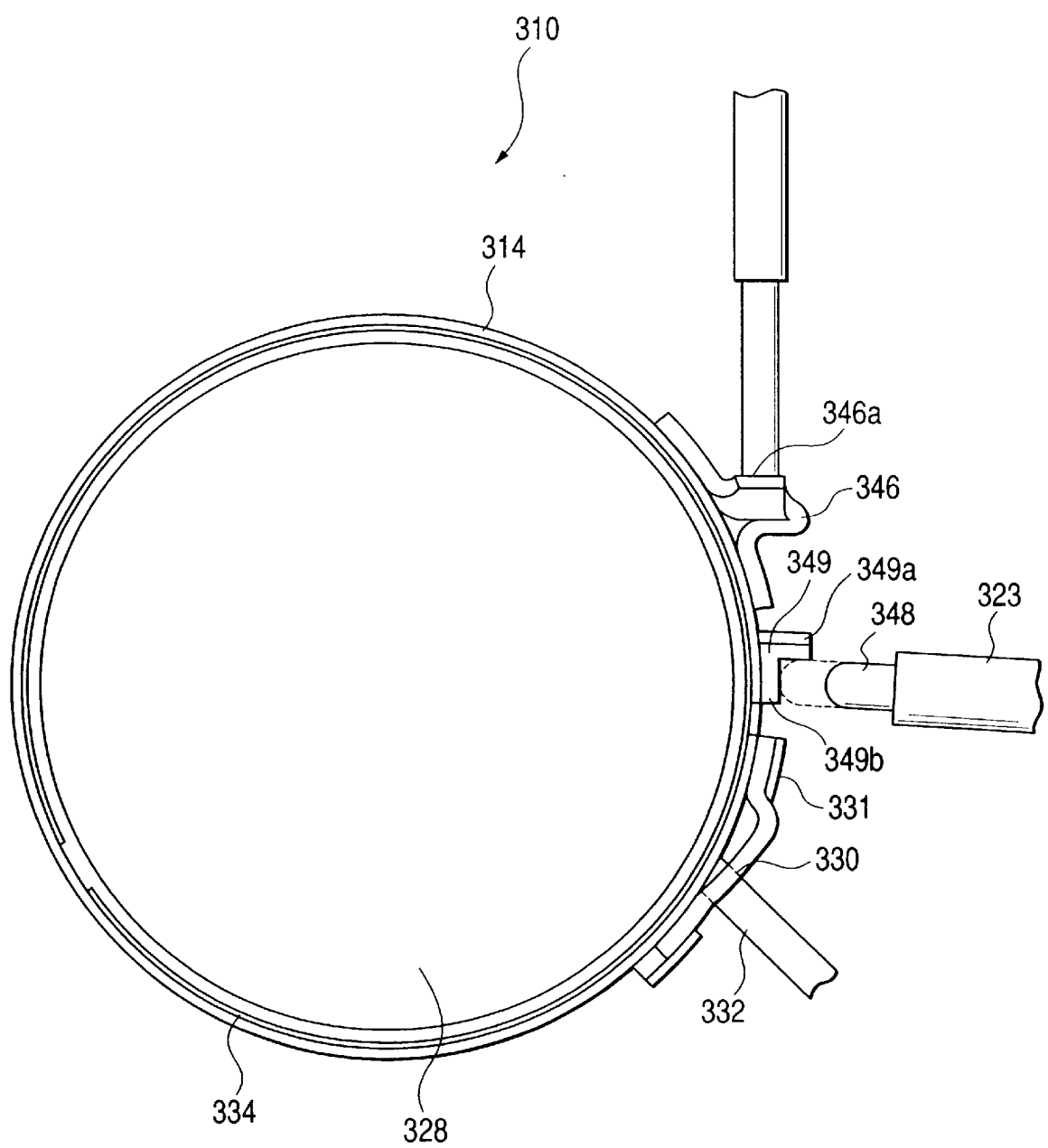
FIG. 8 is a side view showing the double wrap brake band apparatus according to the fourth embodiment of the present invention.
Figure 9:
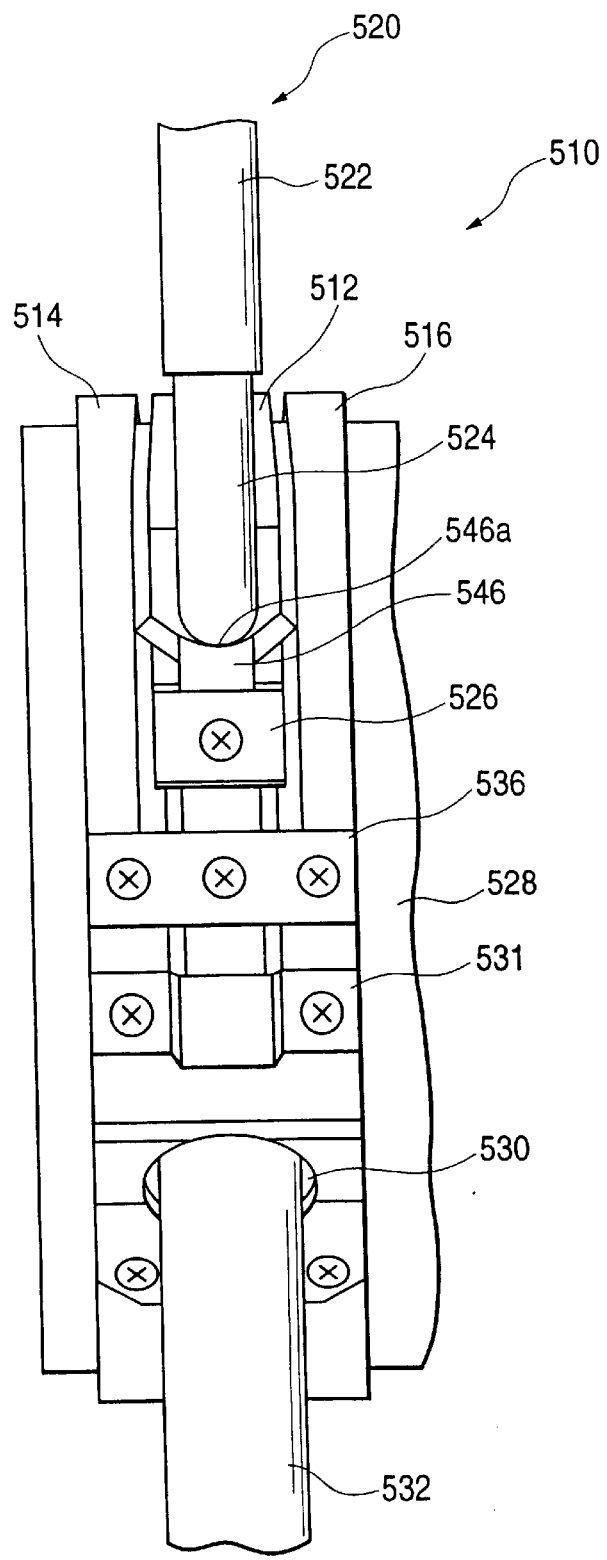
FIG. 9 is a front view showing a conventional double wrap brake band apparatus.
Figure 10:
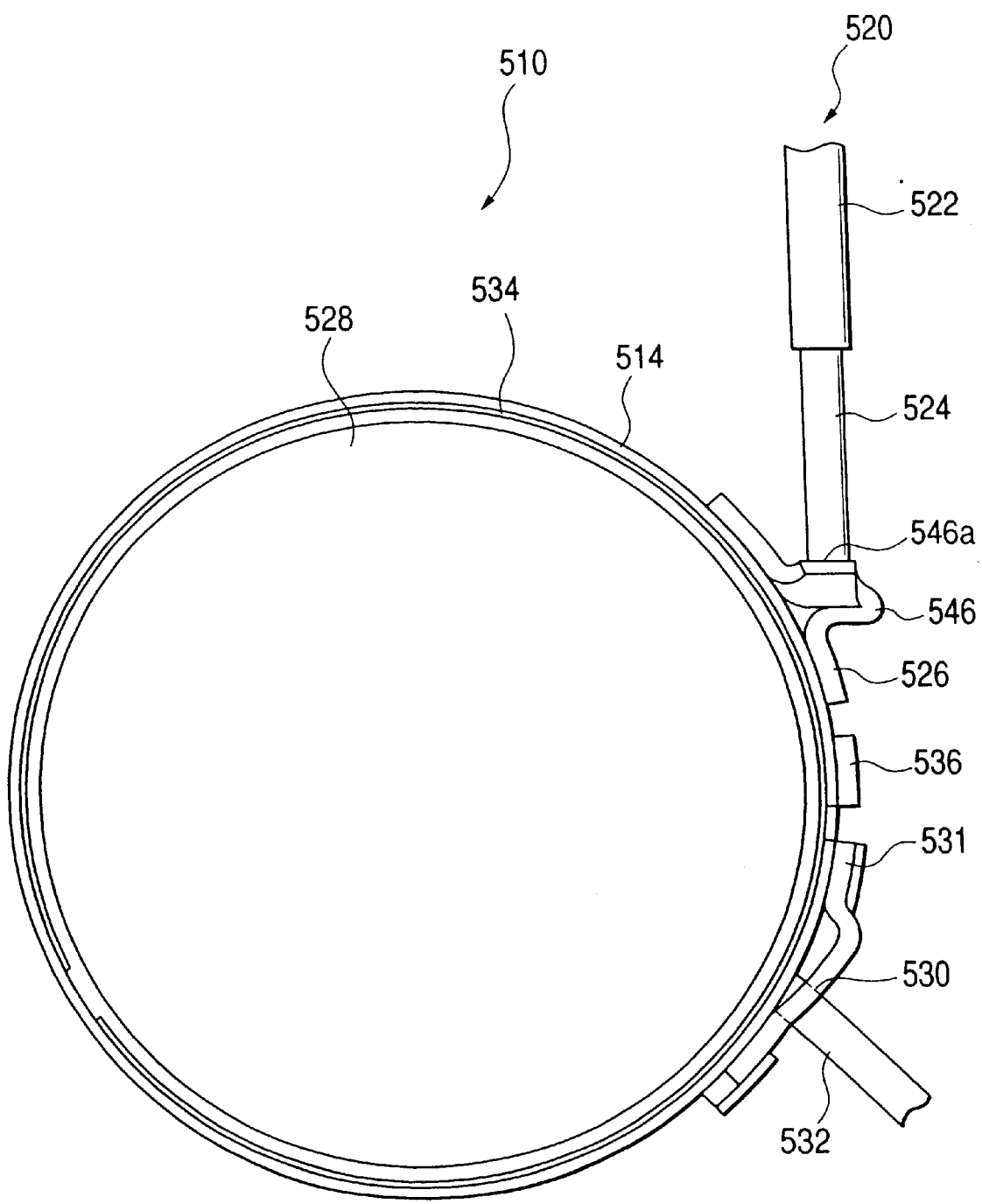
FIG. 10 is a side view showing the conventional double wrap brake band apparatus.

FIGS. 7 and 8 are views showing a double wrap brake band apparatus 310 according to a fourth embodiment of the present invention. Also in this embodiment, a fundamental construction of the double wrap brake band apparatus 310 is the same as those in the aforementioned embodiments.

A connection member 349 is mounted to one end of an intermediate band 312, and an apply bracket 346 having a substantially U-shaped cross-section including a curved receiving surface 346a is mounted to the other end (free end) of the intermediate band.

On the other hand, a first anchor bracket 331 having a hole 330 for receiving an anchor pin 332 is mounted to one ends of outer bands 314, 316 by rivets, and the connection member 349 (for connecting between the intermediate band 312 and the outer bands 314, 316) is mounted to the other ends of the outer bands by rivets. Further, in the illustrated embodiment, the connection member also acts as a second anchor bracket 349.

As shown in FIG. 8, the connection member 349 having a substantially L-shaped cross-section has an upper portion 349a and a side wall 349b. A second anchor pin 348 sliding along a direction (lateral direction in FIG. 8) perpendicular to the side wall 349b is received by a lower surface of the upper portion 349a and an outer surface of the side wall 349b, thereby securing the connection member 349.

With this arrangement, when high torque is required, the second anchor pin 348 is retracted (toward the right in FIG. 8) so that a drum 328 is tightened by the entire double wrap brake band apparatus 310. In this condition, an urging force applied to the first apply bracket 346 of the intermediate band 312 acts in such a manner that the drum 328 is tightened by the intermediate band 312 and the outer bands 314, 316 via the connection member 349.

On the other hand, when low torque is required, the second anchor pin 348 is extended so that it abuts against the upper portion 349a and the side wall 349b of the second anchor bracket 349, thereby securing the second anchor bracket 349. As a result, even if the urging force acts on the first apply bracket 346, the outer bands 314, 316 are secured and only the intermediate band 312 is operated to tighten the drum 328.

As is in this embodiment, a method for operating only the intermediate band 312 is effective in the point that there is no offset abutment in the vicinity of the connecting portion between the intermediate band 312 and the outer bands 314, 316.

Incidentally, the present invention is not limited to the aforementioned embodiments. For example, any bracket may not be provided but a strap may be folded to form a bent portion having a hole to which a pin or wire is connected so that the strap can be operated by a cylinder via the pin or wire. The important matter is that not only the entire double wrap brake band can be operated but also only the outer bands or the intermediate band can be operated.

According to the above-mentioned arrangements, there is provided a double wrap brake band apparatus in which a function of a conventional double wrap brake band apparatus can be performed and only the intermediate band or outer bands can be operated when low torque is received.

What is claimed is:

1. A double wrap brake band apparatus disposed around an outer periphery of a rotatable drum, comprising:

outer bands each having an inner peripheral surface to which a friction material is adhered;

an intermediate band disposed between said outer bands and having an inner peripheral surface to which a friction material is adhered;

a connection portion for connecting one circumferential ends of said outer bands and said intermediate band;

first anchor means provided on circumferential free ends of said outer bands; and first apply means acting on said intermediate band; and wherein second anchor means or second apply means act on said connection portion, wherein said first anchor means comprises a first anchor bracket provided on the free ends of said outer bands and a first anchor pin for engaging and securing said first anchor bracket;

said first apply means comprises a first apply bracket provided on a free end of said intermediate band and a first piston rod for urging said first apply bracket;

said second anchor means comprises a second anchor bracket provided on said connection portion and a second anchor pin acting on said second anchor bracket; and said second apply means comprises a second apply bracket provided on said connection portion and a second piston rod for urging said second apply bracket.

2. A double wrap brake band apparatus according to claim 1, wherein each of said first and second piston rods is operated independently.

3. A double wrap brake band apparatus according to claim 2, wherein said first piston rod is disposed within said second piston rod.

4. A double wrap brake band apparatus according to claim 1, wherein said first and second piston rods are provided on a single piston and at least one of said first and second piston rods is integrally provided via elastic means.

5. A double wrap brake band apparatus according to claim 1, wherein said first and second piston rods are provided on a single piston and at least one of said first and second apply brackets is connected via elastic means.

6. A double wrap brake band apparatus disposed around an outer periphery of a rotatable drum, comprising:
   outer bands each having an inner peripheral surface to which a friction material is adhered;
   an intermediate band disposed between said outer bands and having an inner peripheral surface to which a friction material is adhered;
   a connection portion for connecting one circumferential ends of said outer bands and said intermediate band;
   first anchor means provided on circumferential free ends of said outer bands; and
   first apply means acting on said intermediate band,
      wherein second anchor means or second apply means acts on said connection portion and
      wherein said outer bands can be operated independently of said intermediate band.

7. A double wrap brake band apparatus according to claim 6, wherein said first anchor means comprise a first anchor bracket provided on the free ends of said outer bands and a first anchor pin for engaging and securing said first anchor bracket;
   said first apply means comprises a first apply bracket provided on a free end of said intermediate band and a first piston rod for urging said first apply bracket;
   said second anchor means comprises a second anchor bracket provided on said connection portion and a second anchor pin acting on said second anchor bracket; and
   said second apply means comprises a second apply bracket provided on said connection portion and a second piston rod for urging said second apply bracket.

8. A double wrap brake band apparatus according to claim 7, wherein each of said first and second piston rods is operated independently.

9. A double wrap brake band apparatus according to claim 8, wherein said first piston rod is disposed within said second piston rod.

10. A double wrap brake band apparatus disposed around an outer periphery of a rotatable drum, comprising:
   outer bands each having an inner peripheral surface to which a friction material is adhered;
   an intermediate band disposed between said outer bands and having an inner peripheral surface to which a friction material is adhered;
   a connection portion for connecting one circumferential ends of said outer bands and said intermediate band;
   first anchor means provided on circumferential free ends of said outer bands; and
   first apply means acting on said intermediate band,
      wherein second anchor means or second apply means acts on said connection portion and
      wherein said intermediate band can be operated independently of said outer bands.

11. A double wrap brake band apparatus according to claim 10, wherein said first anchor means comprise a first anchor bracket provided on the free ends of said outer bands and a first anchor pin for engaging and securing said first anchor bracket;
   said first apply means comprises a first apply bracket provided on a free end of said intermediate band and a first piston rod for urging said first apply bracket;
   said second anchor means comprises a second anchor bracket provided on said connection portion and a second anchor pin acting on said second anchor bracket; and
   said second apply means comprises a second apply bracket provided on said connection portion and a second piston rod for urging said second apply bracket.

12. A double wrap brake band apparatus according to claim 11, wherein each of said first and second piston rods is operated independently.

13. A double wrap brake band apparatus according to claim 12, wherein said first piston rod is disposed within said second piston rod.

* * * * *